Patented Aug. 18, 1931

1,819,003

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

MULTIPLE-STEP PROCESS OF FIBER LIBERATION

No Drawing. Application filed March 25, 1930. Serial No. 438,906.

This invention relates to a process of liberating cellulose fiber from raw cellulosic material such as wood, wherein a multiplicity of steps are employed, the last step serving to complete fiber liberation, and the preceding steps serving to modify the raw cellulosic material so that fiber liberation may be easily completed by the last step to produce a product of high alpha cellulose content and of low so-called solution viscosity.

In carrying out the process of the present invention, which is particularly intended for application to raw cellulosic materials such as wood, the wood is cut into chips, as usual, prior to being processed. The process comprises the treatment of the chipped wood with two types of acid liquors, one being a sulphurous acid solution containing, if desired, a bisulphite, and the other being a mineral acid solution, followed by the cooking of the acid-treated wood in an alkaline liquor under temperature and pressure conditions to effect fiber liberation. The sulphurous acid solution is especially effective in reacting upon and removing ligneous groups present in the wood, and serves to remove some pentosans, but the mineral acid solution is relied upon to remove most of the pentosans, as it exerts a powerful hydrolyzing effect thereupon to produce water-soluble reaction products. Both acid treatments are preferably carried out at elevated temperature, the mineral acid solution being comparatively dilute so as not to injure the cellulose fibers which it is desired to liberate. It is possible, however, to produce the desired product by using strong mineral acid solutions, if the treatment therewith is effected at relatively low temperatures. The sulphurous acid solution may contain a suitable bisulphite, but the conditions under which the treatment therewith is carried out are such as not to complete fiber liberation. Either acid treatment may be carried out first, but it is usually preferable to treat first with the sulphurous acid solution, as an initial treatment with the mineral acid solution appears to render the ligneous groups present in the wood less susceptible to reaction by sulphurous acid. When such a sequence of acid treatments is practised, it is important that fiber liberation be incomplete after the initial treatment of the wood with the sulphurous acid solution, for, were fiber liberation complete, the resulting fibers would be more liable to attack by the mineral acid solution than is the case when they are still bound together in chipped form. It may, however, be preferable to treat the chips first with mineral acid solution, and then with sulphurous acid solution, particularly when the resulting product is to be used for papermaking, as such a sequence of acid treatments results in a final product having optimum physical characteristics for that purpose. Evidently the cellulose fibers are less affected by the mineral acid solution when they are associated with the ligneous groups of the raw wood, but in such case the action of the sulphurous acid solution on the ligneous groups is retarded, owing to the chemical transformation which they have undergone by the action of the mineral acid solution. It is to be noted, however, that, inasmuch as it is desired to maintain the wood in chipped form until the final step of the process of the present invention, the retardation of the action of the sulphurous acid solution on the ligneous groups of the wood by the mineral acid solution is not serious.

When a sulphurous acid solution is employed for the initial treatment, the chips need not be washed free of liquor after the treatment, but the mineral acid may be added directly thereto to produce a solution of the desired mineral acid strength. The acidity afforded by the residual sulphurous acid is greatly enhanced by the mineral acid, so that the desired hydrolyzing effect, more particularly upon pentosans, may be secured, the hydrogen ion evidently being the active agency and being supplied largely by the mineral acid rather than by residual sulphurous acid. Various mineral acid solutions may be employed, sulphuric, hydrochloric, nitric, and phosphoric being illustrative of the class.

While various examples of procedure falling within the purview of the present invention are possible, I shall cite only a typical example which may be carried out economically to produce a finished product having the desired characteristics. Wood chips, e. g., spruce, are cooked for about three to four hours at a temperature of about 250° F., in a liquor containing 5% free and 1% combined $SO_2$. The presence of combined $SO_2$ in the liquor as in the form of sodium or calcium bisulphite is preferable, in that it makes possible a greater removal of ligneous groups from the wood in a given period of time, and thus improves the bleachability of the final product. The cooked chips are noticeably softer than the original wood, as a result of the marked removal of ligneous groups therefrom, but they are considerably short of complete fiber liberation. The spent acid sulphite liquor is preferably drained therefrom before subjecting them to treatment with a mineral acid solution, in order to avoid the presence in the mineral acid solution of the organic material extracted therefrom during the initial treatment. If desired, they may be washed in order to complete the removal of residual spent acid sulphite liquor and dissolved organic material extracted therefrom. They are then treated for from four to six hours with a boiling 0.2% to 1% solution of sulphuric acid, which reacts principally on the pentosans present in the wood and additionally serves to modify the fibers in such a way that the finished product is of low solution viscosity. The chips are then washed free of mineral acid solution, whereupon they are cooked at elevated temperature and under pressure in a suitable alkaline liquor, such, for example, as is used in the so-called soda or kraft processes, to complete fiber liberation. The alkaline liquors which I employ may, however, be of much lower alkalinity than the usual fiber-liberating alkaline liquors, as the cellulosic material upon which they act contains much less organic material which must be dissolved to complete fiber liberation, than does raw wood. For example, the cooking operation to complete fiber liberation may be carried out for four hours at 335° F. in a cooking liquor containing only about 1.5 pounds of alkali, calculated as $Na_2O$ per cubic foot, the alkali preferably being present as both caustic soda and sodium sulphide, and the liquor being of 40% sulphidity, which is comparable to the sulphidity of a typical kraft liquor. The use of an alkaline liquor of this composition is advantageous, in that it makes possible a finished product having excellent physical characteristics, including a tear resistance comparable to that of the usual kraft pulp. The finished product is, however, characterized by a composition quite different from that of the usual chemical wood pulps, as it has an alpha cellulose content of about 96%, a pentosan content of about 1.0% to 1.5%, and a solution viscosity of about 0.8 to 1.2. Such a product is vastly superior to the usual chemical wood pulps for use as a raw material in the preparation of cellulose derivatives such, for example, as the acetate and nitrate, which are designed to be used as solutions of low viscosity for the production of such products as artificial silk, films, and lacquers.

I claim:

1. A process which comprises treating raw cellulosic material with a sulphurous acid liquor and with a mineral acid solution short of fiber liberation, and digesting the acid-treated material in an alkaline liquor to complete fiber liberation.

2. A process which comprises treating raw cellulosic material short of fiber liberation with a sulphurous acid liquor containing a bisulphite, treating with a mineral acid solution, washing, and digesting in an alkaline liquor to complete fiber liberation.

3. A process which comprises treating raw cellulosic material short of fiber liberation with a sulphurous acid liquor containing a bisulphite at elevated temperature, treating with a dilute mineral acid solution at elevated temperature, washing, and digesting at elevated temperature and under pressure in an alkaline liquor of comparatively low alkalinity to complete fiber liberation.

In testimony whereof I have affixed my signature.

GEORGE A. RICHTER.